(12) United States Patent  (10) Patent No.: US 8,056,683 B2
Usui  (45) Date of Patent: Nov. 15, 2011

(54) ELECTRIC DISK BRAKE AND LOCK MECHANISM

(75) Inventor: Takuya Usui, Yamanashi (JP)

(73) Assignee: Hitachi, Ltd., Tokyo (JP)

( * ) Notice: Subject to any disclaimer, the term of this patent is extended or adjusted under 35 U.S.C. 154(b) by 855 days.

(21) Appl. No.: 12/149,129

(22) Filed: Apr. 28, 2008

(65) Prior Publication Data

US 2008/0264740 A1 Oct. 30, 2008

(30) Foreign Application Priority Data

Apr. 27, 2007 (JP) ................................. 2007-119055

(51) Int. Cl.
*B60T 1/00* (2006.01)
(52) U.S. Cl. ...... 188/31; 188/72.7; 188/156; 188/196 B; 188/82.1
(58) Field of Classification Search .................... 188/31, 188/69, 72.7, 156, 196 B, 196 BA, 265, 82.1, 188/82.3, 82.34, 82.4, 82.77; 192/219.4, 192/219.5; 310/49.49; 74/527, 530, 575, 74/577 R, 577 M; 70/226, 228, 278.7, 174, 70/190, 245, 247, DIG. 9
See application file for complete search history.

(56) References Cited

U.S. PATENT DOCUMENTS 5,161,650 A * 11/1992 Taig .............................. 188/72.8
7,316,300 B2 * 1/2008 Danne et al. .................. 188/72.1

2003/0066719 A1 4/2003 Watanabe et al.
2005/0217952 A1 10/2005 Usui
2006/0170282 A1 8/2006 Yamaguchi et al.

FOREIGN PATENT DOCUMENTS

EP 1460301 A2 * 3/2004
JP 2003-042199 A 2/2003
JP 2006-232263 A 9/2006

OTHER PUBLICATIONS

Machine translation of EP 1460301-A2.*
Extended European Search Report, App. No. 08154988.3-1523, Jul. 6, 2010 (3 pages).

* cited by examiner

*Primary Examiner* — Bradley King
*Assistant Examiner* — Nicholas J Lane
(74) *Attorney, Agent, or Firm* — Rader, Fishman & Grauer PLLC

(57) ABSTRACT

There is provided an electric disk brake including a caliper and a lock mechanism wherein the lock mechanism shifts with a pad pressing member, and is composed of: a shifting member provided with a plurality of claws with a predetermined pitch in a shifting direction; an engaging member provided with an engaging portion which is engageable with the claws of the shifting member; an actuator driving the engaging member in a direction that the engaging portion engages with the claws of the shifting member; and an energizing means normally energizing the engaging member in a direction that the engaging portion is detached from the claws of the shifting member, and the engaging portion is engaged with the claws provided on one-side surface of the shifting member when being locked while the engaging portion is positioned on the other-side surface of the shifting member when being unlocked.

20 Claims, 6 Drawing Sheets

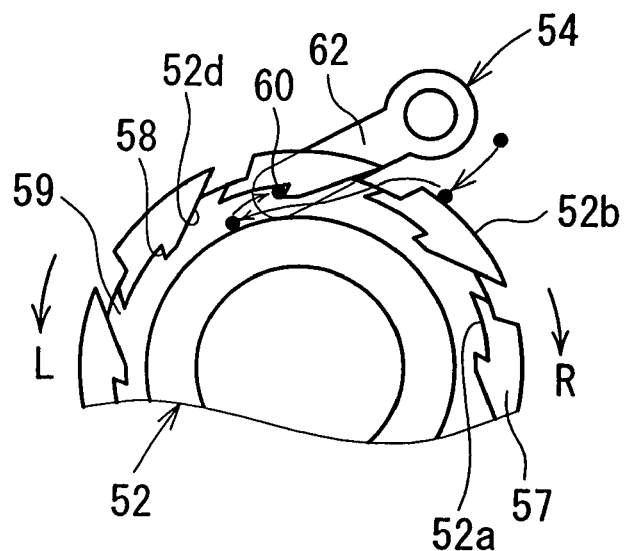
F I G. 5 A
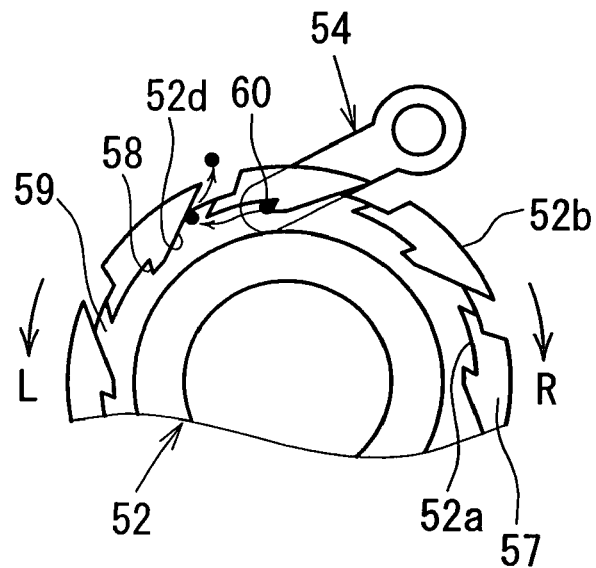
F I G. 5 B
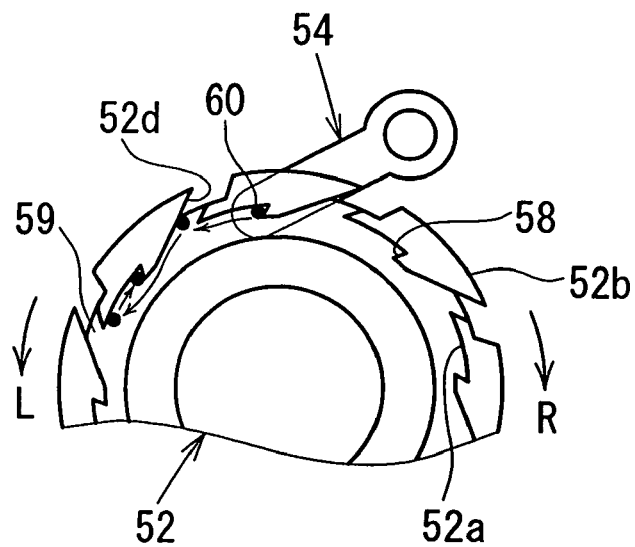
F I G. 5 C

F I G. 8
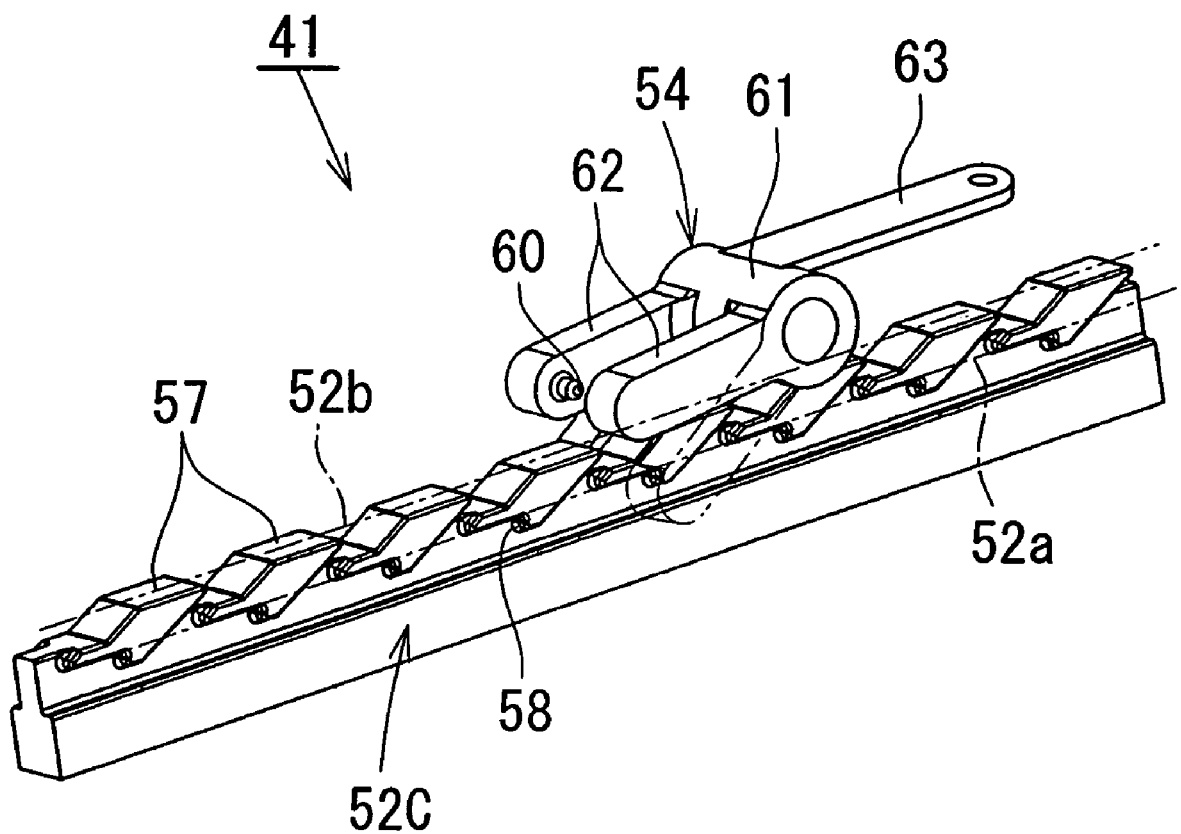

ELECTRIC DISK BRAKE AND LOCK MECHANISM

BACKGROUND OF THE INVENTION

1. Field of the Invention

The present invention relates to an electric disk brake in which to generate braking force with motor torque, and more specifically to an electric disk brake with a parking brake mechanism, and a lock device suitable for the electric disk brake.

2. Description of the Related Art

Conventionally, an electric disk brake has been provided with a caliper comprising: a pad pressing member pressing a brake pad; a motor; and a rotary-to-linear motion conversion mechanism converting rotary motion of a rotor of the motor into linear motion so as to transmit the motion to the pad pressing member (a piston). The pad pressing member is adapted to move forward according to the rotary motion of the rotor of the motor so as to generate braking force by pressing the brake pad to a disk rotor.

In addition to the electric disk brake discussed above, development of an electric disk brake provided with a parking brake has been expedited in recent years; this kind of the electric disk brake is additionally provided with a lock mechanism enabling to lock and unlock displacement of a pad pressing member in a braking release direction so as to retain braking force even after electric power to a motor ceases. For example, in an electric disk brake disclosed in Japanese Patent Application Unexamined Publication No. 2003-42199 (hereinafter reference 1), a rotor of a motor is provided with a ring-shaped rotational body, so that an engaging claw can be engaged with and disengaged from a claw portion of the ring-shaped rotational body by means of an actuator (solenoid). After the rotor of the motor is shifted to a braking position, the engaging claw is engaged with the ring-shaped rotational body so as to retain a braking condition in a non-power state.

In the electric disk brake with the parking brake, however, in case that the parking brake is applied at a high temperature where a brake pad is thermally expanded, pressing force, that is, thrust force of the pad pressing member is deteriorated due to shrinkage of the brake pad along with a subsequent temperature decrease. In traditional methods, when the deterioration of the thrust force is caused due to temperature variations, re-application of the parking brake by re-rotating the motor in a power-intensified direction, so-called re-clamp operation, has been conducted to deal with the above problem. See, for example, Japanese Patent Application Unexamined Publication No. 2006-232263.

However, in the electric disk brake with the parking brake disclosed in the reference 1, the engaging claw is always energized with an energizing means in a direction being disengaged from (see FIGS. 9 and 10) or engaged with (see FIGS. 6 to 8) the claw portion of the ring-shaped rotational body. Accordingly, in case that the engaging claw is always energized in the disengaged direction, if the re-clamp operation is performed in condition that the actuator is broken down during activation of the parking brake, the engaging claw is disengaged from the claw portion of the ring-shaped rotational body, whereby it causes a condition that the parking brake can never be applied. On the other hand, in case that the engaging claw is always energized in the engaged direction, if the actuator is broken down in normal brakes, the lock mechanism will be automatically operated, making vehicle movements unstable (fail-safe unavailable).

SUMMARY OF THE INVENTION

The present invention has been made in light of the above problem, and it is an object of the present invention to provide an electric disk brake, in which even if an actuator which comprises a lock mechanism is broken down, re-clamp operation can be surely performed, and a parking brake is not unintentionally acted with operation of the lock mechanism. It is also an object of the present invention to provide a lock device suitable for the electric disk brake, in which even if the actuator is broken down, not only the re-clamp operation can be surely performed, but also a lock mechanism is not unintentionally acted so as to improve the safety of the lock device.

In order to achieve the object described above according to the present invention, there is provided an electric disk brake comprising: a caliper including: a pad pressing member which presses a brake pad; a motor; and a rotary-to-linear motion conversion mechanism which converts rotation of the motor into linear motion and transmits the motion to the pad pressing member, wherein the pad pressing member is advanced according to the rotation of the motor so as to press the brake pad to a disk rotor to occur braking force; and a lock mechanism enables to lock and unlock the shift of the pad pressing member in a braking release direction, wherein: the lock mechanism shifts interlocking with the pad pressing member, and is composed of: a shifting member provided with a plurality of claws with a predetermined pitch in a shifting direction; an engaging member provided with an engaging portion which is engageable with the claws of the shifting member; an actuator driving the engaging member in a direction that the engaging portion engages with the claws of the shifting member; and an energizing means normally energizing the engaging member in a direction that the engaging portion is detached from the claws of the shifting member, and the engaging portion is engaged with the claws provided on one-side surface of the shifting member when being locked to restrict the shift of the shifting member while the engaging portion is positioned on the other-side surface of the shifting member when being unlocked not to restrict the shift of the shifting member.

With the above electric disk brake, in the re-clamp operation the engaging portion is positioned at the claw on the one-side surface of the shifting member (in locking conditions), whereby parking brakes can be surely re-performed even if the actuator is broken down. Further, the engaging member is normally energized with the energizing means in a direction that the engaging portion is detached from the claw of the shifting member. Accordingly, in unlocking state during normal braking, the engaging portion is positioned on the other-side surface of the shifting member, whereby even if the actuator is broken down, the lock mechanism will not be operated so as to prohibit application of unintentional parking brakes.

Further, in order to achieve another object described above according to the present invention, there is provided a lock mechanism comprising: a shifting member enabling to perform rotational or linear shift and being provided with a plurality of claws with a predetermined pitch in a shifting direction; an engaging member provided with an engaging portion which is engageable with the claws of the shifting member; an actuator driving the engaging member in a direction that the engaging portion engages with the claws of the shifting member; and an energizing means normally energizing the engaging member in a direction that the engaging portion is detached from the claws of the shifting member, wherein: the shifting member has a one-side surface and the other-side surface along the shifting direction of the rotational or linear shift; a plurality of claws is provided on the one-side surface with intervals in the shifting direction; the engaging member has an engaging portion engaging with the plurality of claws; and the engaging portion is engaged with the claws provided on one-side surface of the shifting member when being locked to restrict the shift of the shifting member while the engaging portion is positioned on the other-side surface of the shifting member when being unlocked not to restrict the shift of the shifting member.

With the lock mechanism according to the above, in the re-clamp operation the engaging portion retains engagement with the claw on the one-side surface of the shifting member (in locking conditions), whereby even if the actuator is broken down, re-locking can be surely performed. Further, the engaging portion is normally energized with the energizing means in a direction that the engaging portion is detached from the claw of the shifting member. Accordingly, in normal unlock state the engaging portion is positioned at the other side surface of the shifting member, whereby even if the actuator is broken down, there is no chance that the lock mechanism is operated.

BRIEF DESCRIPTION OF THE DRAWINGS

FIG. 5 is typical views showing operational conditions of the lock mechanism of the electric disk brake according to the present invention, wherein (A) shows a condition that a parking brake is applied; (B) shows a condition that the parking brake is released; and (C) shows a condition that re-clamp is operated;

FIG. 8 is a perspective view showing still another deformed structure of the lock mechanism of the electric disk brake according to the present invention.

DETAILED DESCRIPTION OF THE PREFERRED EMBODIMENTS

Preferred embodiments of the present invention will be described with reference to the accompanying drawings.

Figure 1:
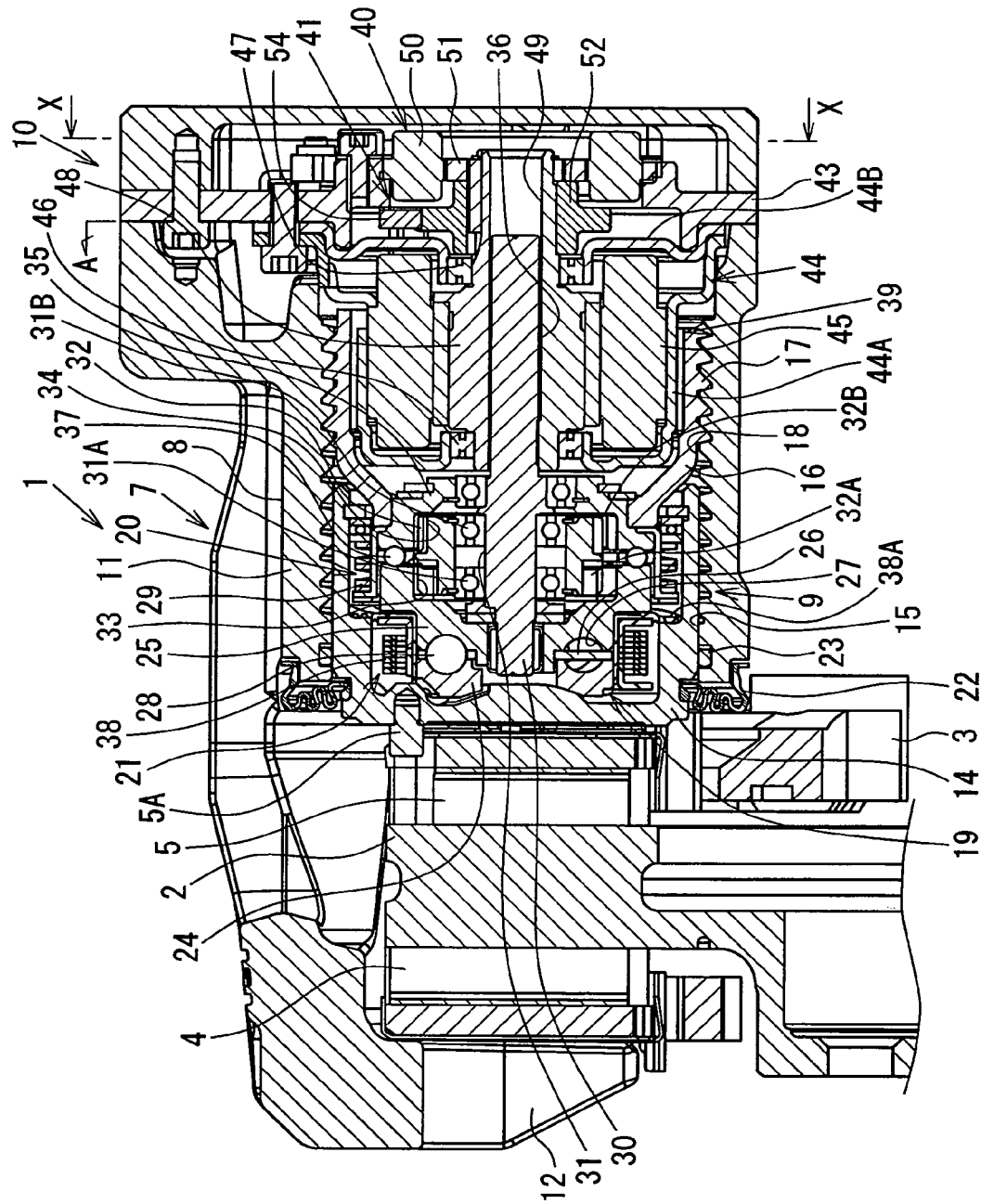
FIG. 1 is a sectional view showing the whole structure of an electric disk brake according to the present invention.
Figure 2:
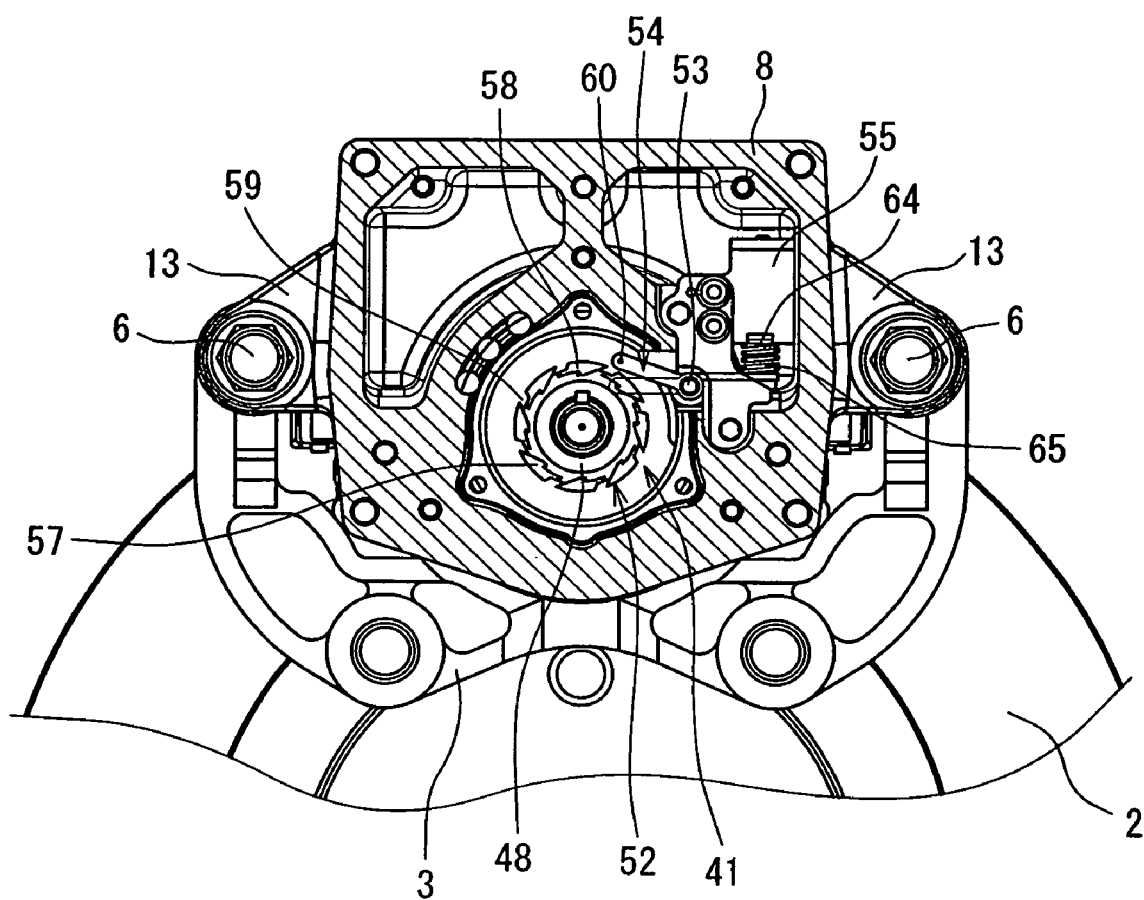
FIG. 2 is a sectional view taken along the line X-X in FIG. 1, which shows the whole structure of the electric disk brake according to the present invention.

Referring to FIGS. 1 and 2, an electric disk brake with a parking brake according to one embodiment of the present invention is disclosed. As shown in the figures, an electric disk brake 1 according to one embodiment of the present invention is categorized into the disk brake of a caliper floating type, and comprises: a disk rotor 2 rotating with a wheel; a carrier 3 fixing to an irrotational portion such as a suspension member (not shown) on a vehicle side; a pair of brake pads 4, 5 arranged on both sides of the disk rotor 2 and supported by the carrier 3; and an electric caliper 7 arranged in such a manner as to step over the disk rotor 2 and supported by a pair of slide pins 6 shiftable along the shaft direction of the disk rotor 2 relative to the carrier 3.

The electric caliper 7 includes a caliper main body 8, a pad pressing member unit 9 and a motor unit 10. The caliper main body 8 is integrally composed of: a cylinder portion 11 with a through-hole opened so as to face one side of the disk rotor 2; a claw portion 12 extended from the cylinder portion 11 to the other side so as to step over the disk rotor 2; and a pair of arm portions 13 extended from the cylinder portion 11 in an approximately diameter direction and each installed with the pair of slide pins 6. At the inner surface of the cylinder portion 11, a guide bore 15 with which a pad pressing member 14 (hereinafter described) of the pad pressing member unit 9 is slidably fitted is provided. Further, an internal thread 18 on which an external thread 17 of an adjustment screw 16 (hereinafter described) fixing to the pad pressing member unit 9 is screwed is provided also at the inner surface of the cylinder portion 11.

The pad pressing member unit 9 is integrally composed of: the cylindrical pad pressing member 14 with a base; a ball ramp mechanism 19 (rotary-to-linear motion conversion mechanism) housed within the pad pressing member 14; a differential reduction mechanism 20; and a pad wear compensation mechanism 21. The pad pressing member 14 is slidably fitted to the guide bore 15 of the caliper main body 8 and abutted to the brake pad 5 of one side while being whirl-stopped by means of a pin 5A. Between the pad pressing member 14 and the guide bore 15 are sealed with a dust seal 22 and a seal ring 23.

The ball ramp mechanism 19 is fixed relative to the bottom surface of the pad pressing member 14, and is composed of: a linear-motion disk 24 shiftable together with the pad pressing member 14 in a shaft direction; a rotary disk 25 shiftable in a rotating direction; and a ball 28 inserted between ball grooves 26, 27 (inclined groove) facing both the linear-motion disk 24 and the rotary disk 25. The rotary disk 25 is always energized toward the linear-motion disk 24 by means of a plurality of wave washers, or a coil wave washer 29 integrally formed with the rotary disk 25. Then, by rotating the linear-motion disk 24 and the rotary disk 25 relative to each other, the ball 28 is rotated between the inclined ball grooves 26, 27, whereby the linear-motion disk 24 and the rotary disk 25 move relative to each other in a shaft direction according to a rotation angle. The rotary motion can be thus converted into the linear motion.

The differential reduction mechanism 20 comprises: an eccentric shaft 30; a ring-shaped spur gear 32 with two external teeth 32A, 32B and rotatably supported with bearings 31A, 31B at an eccentric portion 31 of the eccentric shaft 30; an internal tooth 33 formed at the rotary disk 25 of the ball ramp mechanism 19 and is engaged with the external tooth 32A of one side in the spur gear 32; and a ring gear member 35 with an internal tooth 34 rotatably supported relative to the rotary shaft of the eccentric shaft 30 and engaged with the external tooth 32B of the other side in the spur gear 32. One end of the eccentric shaft 30 is rotatably supported by the rotary disk 25, and the other end thereof is extended within the motor unit 10 so as to form an external spline 36 at the tip portion thereof. One end of the ring gear member 35 is abutted to the distal end of the rotary disk 25 via a thrust bearing 37. Accordingly, by revolving the spur gear 32 while rotating the eccentric shaft 30, the rotary disk 25 with the internal tooth 33 engaged with the external tooth 32A of the spur gear 32 and the ring gear member 35 with the internal tooth 34 engaged with the external tooth 32B perform a differential rotation. Thus, by fixing either the rotary disk 25 or the ring gear member 35, the other can be rotated within deceleration in a predetermined speed reducing ratio.

The pad wear compensation mechanism 21 is provided with: a limiter 38 arranged between the linear-motion disk 24 of the ball ramp mechanism 19 and the rotary disk 25; the adjustment screw 16 connected with the ring gear member 35 of the differential reduction mechanism 20; and a wave washer 38A placed between the ring gear member 35 connected with the adjustment screw 16 and the pad pressing member 14. The limiter 38 provides a certain clearance between the linear-motion disk 24 and the rotary disk 25 with a torsion spring and imparts energy in a return direction. The adjustment screw 16 has the external thread 17 (trapezoidal thread) at the outer periphery thereof wherein the external thread 17 is screwed on the internal thread 18 (trapezoidal thread) formed at the cylinder portion 11 of the caliper main body 8. The adjustment screw 16 is held for not rotating with a certain holding power generated by the wave washer 38A. By rotating against the holding power, the adjustment screw 16 can be shifted in a shaft direction according to relative rotation of the external thread 17 and the internal thread 18. The adjustment screw 16 receives reaction force from the rotary disk 25 via the thrust bearing 37 and the ring gear member 35 and transmits the reaction force to the caliper main body 8 via the external thread 17 and the internal thread 18.

The motor unit 10 is integrally composed of: a motor 39 (electric motor); a resolver 40 detecting rotational positions of the motor 39; and a lock mechanism 41 retaining the rotational positions of the motor 39. The motor 39 is provided with a cylindrical motor case 44 that is mounted on a base plate 43 attached to the end of the caliper main body 8 and inserted into the adjustment screw 16 of the pad pressing member unit 9. Further, a motor stator 45 such as coil is fixed to the inner periphery of the motor case 44. The motor case 44 is composed of a cylindrical motor case main body 44A with a base, and a motor case cover 44B closing an opening of the motor case 44. Bearings 46, 47 are installed into opening portions provided with the motor case main body 44A and the motor case cover 44B, whereby a cylindrical motor rotor 48 (rotor) is rotatably supported by those bearings 46, 47. The motor case 44 is abutted to the inner circumference of the cylinder portion 11 of the caliper main body 8 and is supported in a diameter direction. The inner circumference of the motor rotor 48 is provided with an internal spline 49 engaged with the external spline 36 of the eccentric shaft 30 of the pad pressing member unit 9 so as to transmit turning force between the motor rotor 48 and the eccentric shaft 30. The motor rotor 48 and the eccentric shaft 30 are capable of moving in a shaft direction.

The resolver 40 is composed of: a resolver stator 50 fixed to the base plate 43; and a resolver rotor 51 attached to the tip portion of the motor rotor 48 inserted into the base plate 43 and positioned at the inner circumference of the resolver stator 50. By rotating the resolver stator 50 and the resolver rotor 51, an electrical signal indicating the rotational position of the motor rotor 48 can be outputted.

As mainly shown in FIG. 2, the lock mechanism 41 is composed of: a ring-shaped rotation body (shifting member) 52 attached to the motor rotor 48; an engaging member 54 arranged at the outer circumference of the rotation body 52 and rotatably supported on the base plate 43 with a pin 53; and a solenoid (actuator) 55 fixed on the base plate 43 and driving the engaging member 54. The rotation body 52 is fitted into the rear end (right-end portion of FIG. 1) of the motor rotor 48 and fixed with a key 56 so as to rotate together with the motor rotor 48.

Figure 3:
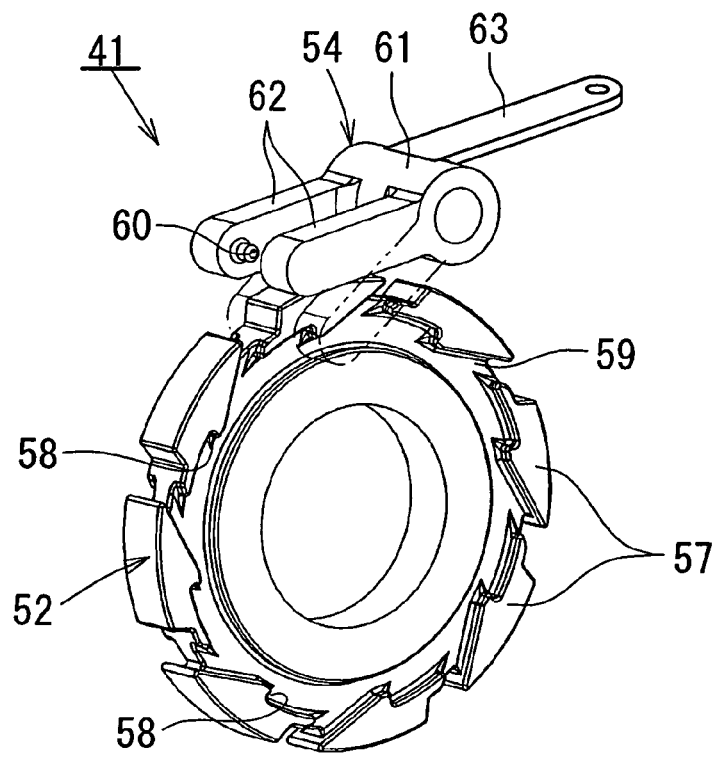
FIG. 3 is a perspective view showing main features of a lock mechanism of the electric disk brake according to the present invention.
Figure 4:
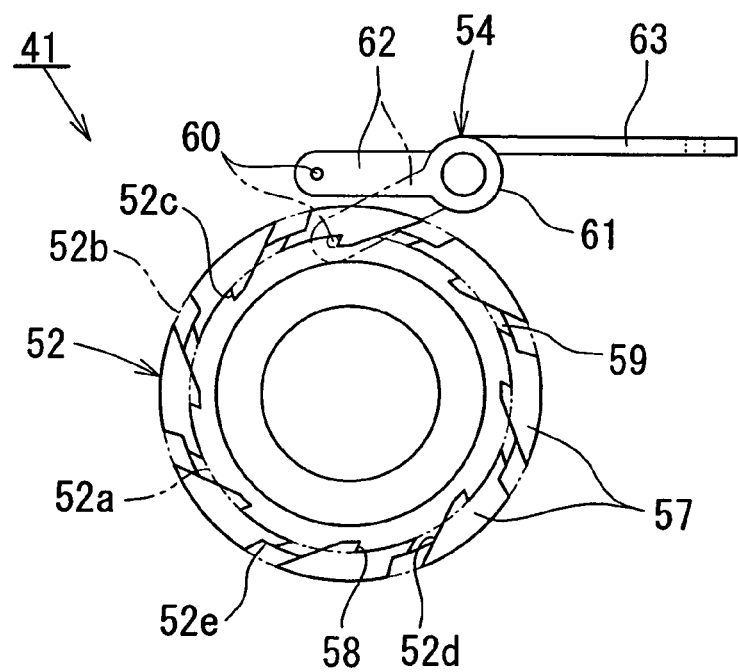
FIG. 4 is a front view showing main features of the lock mechanism of the electric disk brake according to the present invention.

The ring-shaped rotation body 52 is, as well shown in FIGS. 3 and 4, evenly provided with a plurality of teeth 57 at the outer periphery thereof in a circumference direction. Looking at FIGS. 5 and 6, R in a clockwise direction is a braking direction while L in an anticlockwise direction is a braking release direction. In the plurality of teeth 57, an external-side surface (another-side surface) 52b of each thereof is set on the outer periphery of the rotation body 52 while an internal-side surface 52a of each thereof is set on a step portion (one-side surface) 52c, concentricity of which corresponds with the outer periphery of the rotation body 52. The internal-side surface (one-side surface) 52a of each of the teeth 57 is provided with: a claw 58 formed by the step portion 52c adapted to engage with an engaging projection (engaging portion) 60 provided at the tip end of the engaging member 54; and an inner inclination portion (stopper) 52d extended from the claw 58 to the side of the external-side surface 52b in the anticlockwise direction L. Further, on the side of the external-side surface (another-side surface) 52b of each of the teeth 57, an outer-periphery step portion 52e having a diameter smaller than the one of the external-side surface 52b is provided. Between each of the teeth 57, a passage 59 allowing the engaging projection 60 to pass through is provided. The passage 59 is inclined forward in the braking direction R; more specifically the passage 59 is adapted to extend toward the anticlockwise direction L (braking release direction) as shifting from the internal-side surface (one-side surface) 52a to the external-side surface (another-side surface) 52b.

The engaging member 54 is provided with the engaging projection 60 on the tip internal side of a pair of engaging bars 62 unidirectionally extended from a base portion 61 supported with the pin 53. The interval between each of the engaging bars 62 is set slightly larger than the width of each of the teeth 57 of the rotation body 52, whereby the engaging projection 60 of the engaging member 54 will be shiftable from the external-side surface (another-side surface 52b) to the internal-side surface (one-side surface) 52a of the rotation body 52 via the passage 59, and vice versa. The locus of the engaging projection 60 when passing through the passage 59 is designed to intersect the rotational direction of the rotation body 52. By engaging the engaging projection 60 with the claw 58 of the rotation body 52 on the side of the internal-side surface (one-side surface) 52a, the rotation of the rotation body 52 in the braking release direction L is controlled. On the other hand, an arm 63 is extended from the base portion 61 of the engaging member 54, that is, in the adverse direction relative to the direction that the engaging bars 62 are extended. A plunger 64 of the solenoid 55 is connected with the tip end of the arm 63. The plunger 64 of the solenoid 55 is wound around with a compression spring (energizing means) 65, so that the plunger 64 is normally energized in a stretched direction by means of the compression spring 65. Accordingly, the engaging member 54 normally functions to detach the engaging projection 60 from the rotation body 52 so as to maintain a stand-by position as shown with bold lines in FIG. 4. The solenoid 55 is adapted to compress the plunger 64 when power is applied. According to the compression of the plunger 64, the engaging member 54 operates in such a manner as to press the engaging projection 60 into the passage 59 of the rotation body 52.

Hereinafter, effect of the present embodiments structured as discussed above will be explained.

In a normal braking operation, a control current is supplied from a controller (not shown) to the motor 39 according to a braking operation of drivers so as to rotate the motor rotor 48 in a braking direction. The rotation of the motor rotor 48 is reduced with a predetermined speed reducing ratio by means of the differential reduction mechanism 20 and converted into a linear motion by the ball ramp mechanism 19 so as to advance the pad pressing member 14. With the advancement of the pad pressing member 14, the brake pad 5 of one side is pressed to the disk rotor 2, whereby the caliper main body 8 is shifted along the slide pin 6 of the carrier 3 with its reaction. The claw portion 12 then presses the brake pad 4 of the other side to the disk rotor 2 so as to generate braking force. Further, when releasing the braking, the pad pressing member 14 is backed up by rotating the motor rotor 48 in an inverse direction so as to detach the brake pads 4, 5 from the disk rotor 2.

Furthermore, with each sensor operated by the controller, vehicle conditions such as rotational speeds of each wheel, vehicle speeds, vehicle acceleration, steering angles or lateral accelerations are detected. Based on the detection, the rotation of the motor 39 can be controlled, whereby servo controls, anti-lock controls, traction controls or vehicle stabilizing controls can be performed.

Next, operation of the differential reduction mechanism 20 and the pad wear compensation mechanism 21 is hereinafter explained.

When the eccentric shaft 30 rotates with the motor rotor 48 in a braking state, the spur gear 32 will be revolved by the eccentric rotation of the eccentric portion 31, whereby the rotary disk 25 and the ring gear member 35 engaged with the external teeth 32A, 32B of the spur gear 32 will perform a differential rotation. Here, in normal operations the rotation of the ring gear member 35 is locked together with the adjustment screw 16 by means of the wave washer 38A. On the other hand, since the rotary disk 25 is allowed to rotate freely within the range of clearance of the limiter 38, only the rotary disk 25 rotates. Accordingly, the ball ramp mechanism 19 advances the pad pressing member 14 so as to press the brake pads 4, 5 to the disk rotor 2. After the brake pads 4, 5 start to press the disk rotor 2, its reaction force acts on the external thread 17 and the internal thread 18, whereby the rotation of the adjustment screw 16, that is the ring gear member 35, can be surely locked in proportion to friction increase between the brake pads 4, 5. The rotary disk 25 can thus rotate against the spring force of the limiter 38.

In case that the brake pads 4, 5 abrade, and the rotary disk 25 is thus prohibited from pressing the disk rotor 2 even though it goes beyond the range of clearance of the limiter 38, spring force of the limiter 38 will act on the rotary disk 25 to be fixed. The adjustment screw 16 thus rotates together with the ring gear member 35 against holding power of the wave washer 28A. The adjustment screw 16 is advanced by the relative rotation of the external thread 17 and the internal thread 18 so as to make the pad pressing member unit 9 to move forward. When the brake pads 4, 5 move forward only for abrasion amounts and start to press the disk rotor 2, as discussed hereinbefore, frictional force of the external thread 17 and the internal thread 18 will be increased with its reaction so as to lock the rotation of the adjustment screw 16. Then, the rotary disk 25 rotates against spring force of the limiter 38, whereby the pad pressing member 14 advances with the ball ramp mechanism 19. As discussed above, it is possible to move forward the pad pressing member unit 9 only for abrasion amounts of the brake pads 4, 5 by means of the adjustment screw 16, contributing to compensation of abrasions of the brake pads 4, 5.

Now, operation of the lock mechanism 41 will be explained based on figures. Here, as to the engaging member 54 in FIG. 5, only the side of the engaging bars 62 is shown only for explanation purposes. Locus of the engaging projection 60 of the engaging member 54 is indicated with ●.

When operating a parking brake, power is applied to the solenoid 55 of the lock mechanism 41 with commands from the controller so as to shift the plunger 64 in a compressed direction. Here, as shown in FIG. 5(A), the engaging member 54 tilts as that the engaging member 54 lowers the side of the engaging bar 62, whereby the engaging projection 60 shifts to the position where to contact with the outer-periphery step portion 52e placed on the upper surface of the teeth 57 provided at the external-side surface (another-side surface) 52b. In this condition, if the motor rotor 48 is rotated in a braking direction, the ring-shaped rotation body 52 is also rotated in the braking direction R. As also shown in FIG. 5(A), the engaging projection 60 of the engaging member 54 shifts to the side of the internal-side surface (one-side surface) 52a through the passage 59 as same as the inner inclination portion 52d. Then, as same as normal braking, the motor rotor 48 rotates until the brake pads 4, 5 are pressed against the disk rotor 2 with desired force.

In a degree that the predetermined braking force occurs, power to the solenoid 55 comes to a halt while the motor rotor 48 is slightly rotated into the braking release direction L. Since the engaging member 54 is energized into a direction separating from the rotation body 52 by means of the compression spring 65 wound around the plunger 64 of the solenoid 55, as also shown in FIG. 5(A), the engaging projection 60 of the engaging member 54 shifts to a position where to engage with the claw 58 of the rotation body 52 so as to restrict the rotation of the rotation body 52 in the braking release direction L. Accordingly, even if power to the motor 39 is suspended in subsequent steps, thrust force of the pad pressing member 14 is maintained so as to support the parking brake.

In case of releasing the parking brake, in a condition that power to the solenoid 55 is stopped, the rotation body 52 is slightly rotated in the braking direction R by the rotation of the motor rotor 48. Then, as shown in FIG. 5(B), the engaging projection 60 of the engaging member 54 is detached from the claw 58 of the rotation body 52 so as to abut to the inner inclination portion 52d. Subsequently, the rotation body 52 is rotated in the braking release direction L by the rotation of the motor rotor 48. Accordingly, energizing force of the compression spring 65 will make the engaging member 54 tilted toward a stand-by position (see FIG. 4), and the engaging projection 60 shifts the side of the external-side surface (another-side surface) 52b through the passage 59 of the rotation body 52 so as to detach from the rotation body 52. Based on the above, the pad pressing member 14 moves backward; the brake pads 4, 5 are detached from the disk rotor 2; and the parking brake is released. Since the engaging member 54 is normally maintained in the stand-by position with the compression spring 65, the lock mechanism 41 will not operate even if the actuator is broken down during normal braking. That is, unintentional parking brakes can be avoided so as to prevent from unstable vehicle movements (fail-safe inability).

On the other hand, during the parking brakes discussed above, in case the brake pads 4, 5 are constricted due to a temperature decline; pressing force of pistons decreases; and a re-clamp operation needs to be performed, the rotation body 52 will be rotated in the braking direction R by the rotation of the motor rotor 48 in a condition that power to the solenoid 55 is at a halt. Accordingly, as shown in FIG. 5(C), the engaging projection 60 of the engaging member 54 is detached from the claw 58 of the rotation body 52 and shifts to the position where to abut to the inner inclination portion 52d facing the passage 59. Since the passage 59 is, as discussed above, inclined toward the front side of the braking direction R, the engaging projection 60 cannot shift to a pulling-out direction from the passage 59, whereby the engaging projection 60 shifts to the side of the internal-side surface 52a of the teeth 57 adjacently provided along the inclination of the passage 59. Accordingly, the inner inclination portion 52d facing the passage 59 functions as a stopper restricting the engaging projection 60 (engaging portion) of the engaging member 54 to shift in a direction where to detach from the claw 58 of the ring-shaped rotation body 52 as a shifting member.

Thereafter, by the rotation of the motor rotor 48, the rotation body 52 is slightly rotated in the braking release direction L. As same as when the parking brakes apply, the engaging projection 60 of the engaging member 54 shifts to a position where to engage with the claw 58 of the rotation body 52 thereby restricting the rotation of the rotation body 52 in the braking release direction L. Accordingly, even if power to the motor 39 comes to a halt in subsequent steps, thrust force of the pad pressing member 14 can be retained. That is, even if the solenoid 55 is broken down when the parking brakes apply, the parking brakes can be re-supported, contributing to the safe performance of the re-clamp operation.

Figure 6:
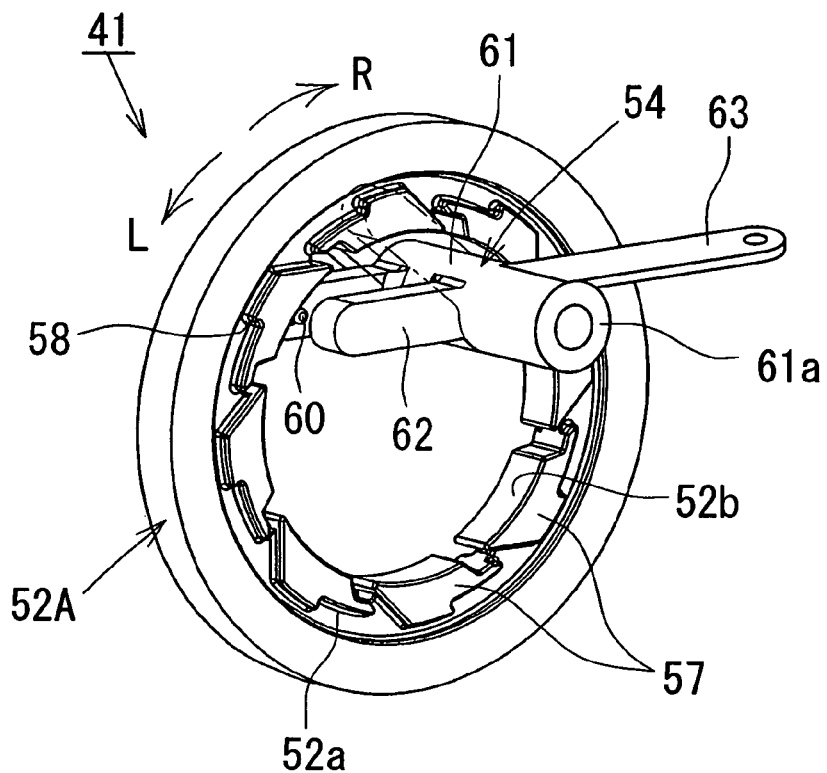
FIG. 6 is a perspective view showing a deformed structure of the lock mechanism of the electric disk brake according to the present invention.
Figure 7:
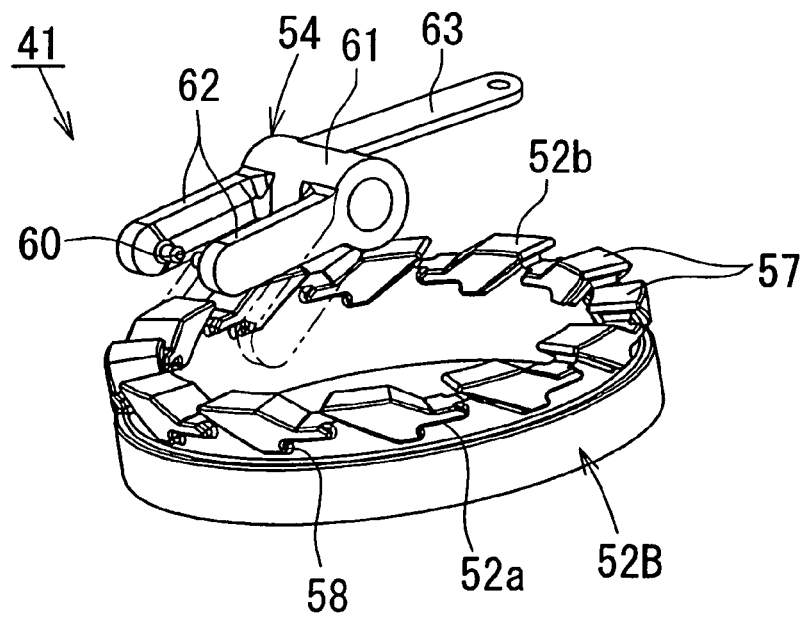
FIG. 7 is a perspective view showing an another deformed structure of the lock mechanism of the electric disk brake according to the present invention.

Here, in the above embodiments, the ring-shaped rotation body 52 having the teeth 57 at the outer periphery thereof is applied as the shifting member constituting the lock mechanism 41; however, the shifting member may be, as shown in FIG. 6, a ring-shaped rotor 52A arranging the teeth 57 at the inner diameter thereof. In this case each inner-side surface of the teeth 57 is provided on an inner-circumference surface (another-side surface) 52b of the rotor 52A. Further, each outer-side surface of the teeth 57 is provided on a stepped surface (one-side surface) 52a having the same concentricity with the inner-circumference surface. On the outer-side surface of the teeth 57, the claw 58 for engaging the engaging projection (engaging portion) 60 of the engaging member 54 is provided. On the other hand, in the engaging member 54, only the engaging bar 62 with the engaging projection 60 is arranged on the inner-diameter side of the rotor 52A. The base portion 61 of the engaging member 54 has an extended portion 61a, the shaft of which is extended; the arm 63 connected to the plunger 64 of the solenoid 55 is provided to the extended portion 61a. The functional effect of the lock mechanism 41 is the same as the above embodiments discussed; however, since the engaging member 54 is arranged on the inner-diameter side of the rotor 52A as the shifting member, it is possible to reduce the diameter of the whole device.

Further, the shifting member constituting the lock mechanism 41 may be, as shown in FIG. 8, a rack-shaped longitudinal body 52C arranging the teeth 57 on the lateral side thereof. In this case an outer-side surface of each of the teeth 57 is provided on a side surface (another side surface) 52b of the longitudinal body 52C while an inner-side surface thereof is provided on a stepped surface (one-side surface) 52a parallel with the side surface 52b. Further, on the inner-side surface of each of the teeth 57, the claw 58 for engaging the engaging projection (engaging portion) 60 of the engaging member 54 is provided. The longitudinal body 52C is provided within the caliper main body 8 in such a manner as to be connectable with the linear-motion disk 24 or the pad pressing member 14 of the ball ramp mechanism 19. The functional effect of the lock mechanism 41 is the same as the above embodiments discussed; however, the longitudinal body 52C as the shifting member will have a smaller profile compared to the ring-shaped rotation body 52, 52A, 52B, so that the diameter of the whole device can be further reduced.

In the above embodiments, the example, in which the lock mechanism 41 is applied to the electric disk brake 1, has been disclosed; however, the present invention is not limited thereto but applicable to machine tools in general. Especially, the lock mechanism 41 shown in FIG. 8 is applicable to lifts for vehicle maintenance, stacker cranes for auto-stacking warehouse, etc.

What is claimed is:

1. An electric disk brake comprising:
 a caliper including: a pad pressing member which presses a brake pad; a motor; and a rotary-to-linear motion conversion mechanism which converts rotation of the motor into linear motion and transmits the motion to the pad pressing member, wherein the pad pressing member is advanced according to the rotation of the motor so as to press the brake pad to a disk rotor to occur braking force; and
 a lock mechanism that locks and unlocks shifting of the pad pressing member in a braking release direction, wherein:
 the lock mechanism comprises: a shifting member provided with a plurality of teeth with a predetermined pitch in a shifting direction; an engaging member provided with an engaging portion which is engageable with a claw provided at each of the plurality of teeth of the shifting member; wherein:
 each of the teeth has a one-side surface provided with the claw and an another-side surface placed opposite to the one-side surface, the one-side surface and the another-side surface arranged in a shifting direction of the engaging portion;
 a passage is provided between each of the teeth so as to allow the engaging portion to pass through between the one-side surface side and the another-side surface side;
 the lock mechanism further includes an actuator driving the engaging member so as to allow the engaging portion to be shifted in a direction from the another-side surface side to the one-side surface side, and an energizing means normally energizing the engaging member in a direction that the engaging portion directs from the one-side surface side to the another-side surface side; and
 the engaging portion is placed at the one-side surface side of the shifting member and engages with the claw when being locked to restrict the shift of the shifting member while the engaging portion is placed at the another-side surface side of the shifting member when being unlocked not to restrict the shift of the shifting member.

2. An electric disk brake according to claim 1, wherein, when being locked, the engaging portion of the engaging member shifts with operation of the actuator from the another-side surface side of the shifting member to the one-side surface side thereof through the passage so as to be in a condition that the engaging portion is locked to engage with the claw of the one-side surface side of the shifting member.

3. An electric disk brake according to claim 1, wherein, when the engaging portion of the engaging member is placed at the passage, the engaging portion is shifted with energizing force of the energizing means to be unlocked from the one-side surface side of the shifting member to the another-side surface side thereof through the passage.

4. An electric disk brake according to claim 3, wherein locus of the engaging member is arranged in that: the engaging portion is prohibited from shifting from the one-side surface side of the shifting member to the another-side surface side thereof when the shifting member shifts in a braking direction; and the engaging portion is allowed to shift from the one-side surface side of the shifting member to the another-side surface side thereof when the shifting member shifts in a braking release direction.

5. An electric disk brake according to claim 4, wherein the passage is made to extend in the braking release direction of the shifting member as moving from the one-side surface side to the another-side surface side.

6. An electric disk brake according to claim 1, wherein the engaging portion of the engaging member passes through the passage by energizing force of the energizing means or driving force of the actuator.

7. An electric disk brake according to claim 1, wherein a stopper is provided so that the engaging portion of the engaging member is restricted to shift from the one-side surface side to the another-side surface side of the shifting member by passing through the passage when operating re-application of a parking brake by re-rotating the motor in a braking direction to enhance thrust force of the pad pressing member.

8. An electric disk brake according to claim 1, wherein the shifting member is a ring-shaped rotation body which rotates with a rotor of the motor, and one-side surface of the shifting member is defined as an inner side in a diameter direction while the another-side surface thereof is defined as an outer side in a diameter direction.

9. An electric disk brake according to claim 1, wherein the shifting member is a ring-shaped rotation body which rotates with a rotor of the motor, and one-side surface of the shifting member is defined as an outer side in a diameter direction while the another-side surface thereof is defined as an inner side in a diameter direction.

10. An electric disk brake according to claim 1, wherein the shifting member is a ring-shaped rotation body which rotates with a rotor of the motor, and the one-side surface of the shifting member is defined as an end surface side while the another-side surface thereof is defined as a side departed from the end surface side.

11. A lock mechanism comprising:
a shifting member that performs rotational or linear shift and is provided with a plurality of teeth with a predetermined pitch in a shifting direction of the shifting member; and
an engaging member provided with an engaging portion which is engageable with a claw provided at each of the plurality of teeth of the shifting member,
wherein:
each of the teeth has a one-side surface and an another-side surface, the one-side surface being provided with the claw arranged along the shifting direction of the rotational or linear shift of the shifting member;
a passage is provided between each of the teeth so as to allow the engaging portion of the engaging member to pass through between the one-side surface side and the another-side surface side;
the lock mechanism further comprises an actuator that drives the engaging member as that the engaging portion directs from the another-side surface side to the one-side surface side, and an energizing means that normally energizes the engaging member as that the engaging portion directs from the one-side surface side to the another-side surface side;
and
the engaging portion is placed at the one-side surface side of the shifting member and engages with the claw when being locked to restrict the shift of the shifting member while the engaging portion is placed at the another-side surface side of the shifting member when being unlocked not to restrict the shift of the shifting member.

12. A lock mechanism according to claim 11, wherein, when being locked, the engaging portion of the engaging member shifts with operation of the actuator from the another-side surface side of the shifting member to the one-side surface side thereof through the passage so as to be in a condition that the engaging portion is locked to engage with the claw of the one-side surface side of the shifting member.

13. A lock mechanism according to claim 11, wherein, when the engaging portion of the engaging member is placed at the passage, the engaging portion is shifted with energizing force of the energizing means to be unlocked from the one-side surface side of the shifting member to the another-side surface side thereof through the passage.

14. A lock mechanism according to claim 13, wherein locus of the engaging member is arranged in that: the engaging portion is prohibited from shifting from the one-side surface side of the shifting member to the another-side surface side thereof when the shifting member shifts in one direction; and the engaging portion is allowed to shift from the one-side surface side of the shifting member to the another-side surface side thereof when the shifting member shifts in the other direction.

15. A lock mechanism according to claim 14, wherein the passage is made to extend in the other direction of the shifting member as moving from the one-side surface side to the another-side surface side.

16. A lock mechanism according to claim 11, wherein the engaging portion of the engaging member passes through the passage by energizing force of the energizing means or driving force of the actuator.

17. A lock mechanism according to claim 11, wherein the shifting member is a ring-shaped, rotatable rotation body, and one-side surface of the shifting member is defined as an inner side in a diameter direction while the another-side surface thereof is defined as an outer side in a diameter direction.

18. A lock mechanism according to claim 11, wherein the shifting member is a ring-shaped, rotatable rotation body, and one-side surface of the shifting member is defined as an outer side in a diameter direction while the another-side surface thereof is defined as an inner side in a diameter direction.

19. A lock mechanism according to claim 11, wherein the shifting member is a ring-shaped, rotatable rotation body, and one-side surface of the shifting member is defined as an end surface side while the another-side surface thereof is defined as a side departed from the end surface side.

20. A lock mechanism according to claim 11, wherein the shifting member is a bar-shaped member capable of a longitudinal motion, and the one-side surface of the shifting member is as an outer surface side while the another-side surface thereof is defined as an inner surface side.

* * * * *